No. 629,078. Patented July 18, 1899.
A. HOLZ.
DRAWING INSTRUMENT.
(Application filed Dec. 31, 1897.)

(No Model.)

Witnesses:
James R. Mansfield,
W. C. Sullivan

Inventor:
Arno Holz.
By:
Alexander & Dowell
Attorneys.

UNITED STATES PATENT OFFICE.

ARNO HOLZ, OF WILMERSDORF, GERMANY.

DRAWING INSTRUMENT.

SPECIFICATION forming part of Letters Patent No. 629,078, dated July 18, 1899.

Application filed December 31, 1897. Serial No. 664,947. (No model.)

*To all whom it may concern:*

Be it known that I, ARNO HOLZ, author, of Wilmersdorf, near Berlin, Prussia, in the Empire of Germany, have invented a new Drawing Instrument, of which the following is a specification, reference being had therein to the accompanying drawings.

This invention is an improved drafting instrument particularly designed for the execution of various geometrical designs, and it has been already patented in Germany, (patent No. 84,270, dated February 5, 1895.)

The object of the invention is to dispense with the necessity of the ruler and the protractor heretofore necessary in executing geometrical designs by providing a single instrument which can be adapted to perform the work of both, and the invention is summarized in the claims, and the accompanying drawings illustrate two useful instruments embodying the invention.

Figure 1:
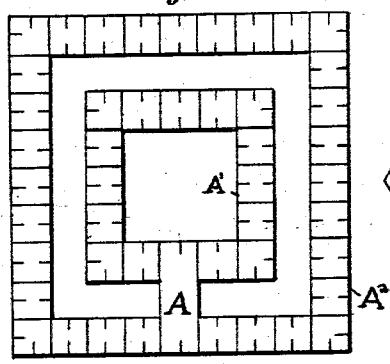
Figure 2:
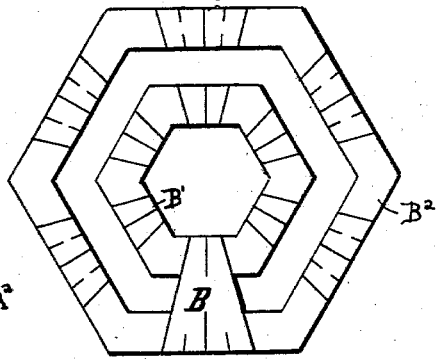
Figure 3:
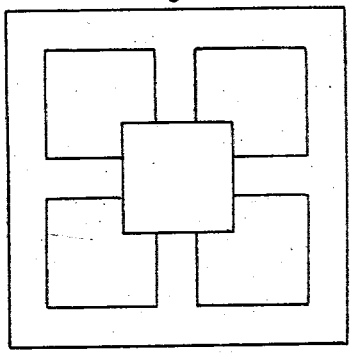
Figure 4:
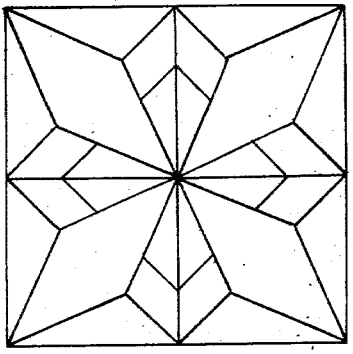
Figure 5:
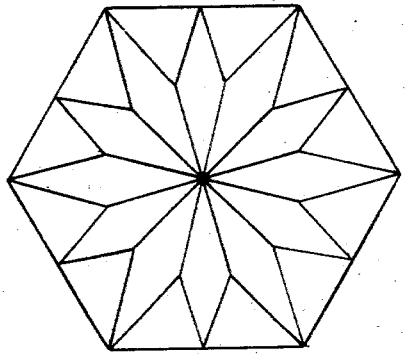
Figure 6:
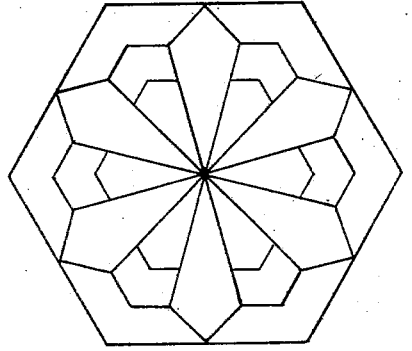

Figure 1 shows a plan view of one form of the device; Fig. 2, a plan view of a modification thereof, Figs. 3 and 4 illustrating geometrical designs drawn by the aid of the instrument shown in Fig. 1, and Figs. 5 and 6 are other designs drawn by the aid of the instrument shown in Fig. 2.

The invention consists, essentially, in the employment of two or more concentrically-disposed frames arranged in the same plane and rigidly connected at one or more points, so as to hold them in proper relative position, and may each be properly scaled for the convenience of the draftsman.

As shown in Fig. 1, the instrument is formed of an inner square frame $A'$ and an outer concentric square frame $A^2$, and these frames are connected by a stem A, as shown in Fig. 2. The inner and outer frames $B'$ $B^2$ are six-sided and connected by a stem B.

Obviously the particular geometrical form of the frames may be varied within the scope of the invention, the essential feature being that two or more frames of like form be concentrically arranged in the same plane.

Having thus described my invention, what I therefore claim as new, and desire to secure by Letters Patent, is—

1. A drafting instrument composed of a number of similar concentrically-arranged frames, arranged in the same plane and rigidly connected.

2. A drafting instrument consisting of inner and outer concentrically-arranged polygonal frame-like pieces lying in the same plane and rigidly united.

3. A drafting instrument composed of inner and outer polygonal frames of similar contour arranged in the same plane and rigidly united, and each properly scaled, for the purpose and substantially as described.

In witness whereof I have hereunto set my hand in presence of two witnesses.

ARNO HOLZ.

Witnesses:
 CHAS. H. DAY,
 KAR HENSMAN.